United States Patent [19]

Van Steenburg

[11] Patent Number: 4,678,196
[45] Date of Patent: Jul. 7, 1987

[54] CHILD CAR SEAT CONVERTIBLE INTO A STROLLER

[76] Inventor: Kip Van Steenburg, 4 Marlboro Rd., Sudbury, Mass. 01776

[21] Appl. No.: 826,408

[22] Filed: Feb. 5, 1986

[51] Int. Cl.$^4$ ............................................. B62B 7/10
[52] U.S. Cl. ................................. 280/47.41; 297/345
[58] Field of Search ...................... 297/345, 234, 254; 280/30, 9, 47.18, 47.38, 47.36, 47.39, 47.4, 47.41

[56] References Cited

U.S. PATENT DOCUMENTS

| | | | |
|---|---|---|---|
| 2,481,382 | 9/1949 | Bennett | 297/254 X |
| 2,720,911 | 10/1955 | Lantz | 297/234 X |
| 3,542,419 | 11/1970 | Spinola | 297/254 X |
| 4,065,175 | 12/1977 | Perego | 297/345 X |
| 4,186,963 | 2/1980 | Koutsky | 297/345 X |

*Primary Examiner*—John J. Love
*Assistant Examiner*—Michael Mar
*Attorney, Agent, or Firm*—Joseph S. Iandiorio; Douglas E. Denninger

[57] ABSTRACT

A superstructure, functioning as the car seat, is retractably telescoped into a base member when the transporter is to be positioned upon the seat of an automobile, the child being strapped within the car seat portion of the superstructure. The transporter is thereafter easily removed from the automobile, and the superstructure is slidably extended from the base member to convert it into a stroller, and is maintained in a first extended position away from the base member by a locking mechanism. The transporter is converted back into a compact car seat, by unlocking the locking device, by applying two discrete motions for safety reasons, to cause the transporter to be collapsed, before insertion back into the automobile. During the collapsing of the transporter, a pair of wheel covers are automatically actuated, to cover the rims of the wheels to prevent any debris picked up by the wheels from being deposited on the car seats, and additionally to stabilize the transporter upon the seat of the automobile. The superstructure and base member are each configured of light weight, non-collapsible, structures in contrast with the collapsible tubular frameworks generally utilized in present day strollers; thus manufacturing costs are reduced.

8 Claims, 4 Drawing Figures

CHILD CAR SEAT CONVERTIBLE INTO A STROLLER

FIELD OF THE INVENTION

This invention relates to the field of transporting human infants and toddlers.

BACKGROUND OF THE INVENTION

Car seats designed to support an infant or toddler, are currently sold in the market place, and include safety belts for holding the child upon the seat. If a parent is taking the child along on a shopping trip for example, the child is placed in the car seat until the car arrives at the shopping center. Typically a stroller is opened up, and the child is physically transferred from the car seat to the stroller. Generally such strollers are collapsible, and must be manipulated to be converted into their full operating size and configuration. The removal of a sometimes uncooperative child from a car seat, in order to place the child in the stroller, is somewhat annoying, particularly if the child starts "acting up". Upon the return trip, the stroller has to be collapsed, to conveniently store it in the car, and the child, who may be sleeping, must be transferred back to the car seat.

SUMMARY OF INVENTION

It is therefore an object of this invention to eliminate the need to carry a collapsed stroller in the car and to open and close it.

It is a further object of this invention to provide a transport device configured in the form of a car seat which is readily removable from the car without unstrapping the child from the seat, and which is easily converted into a stroller, and after use as a stroller, converted back to a car seat, again without disturbing the child.

These desirable objectives are reached by providing a superstructure, functioning as the car seat, which is retractably telescoped into a base member when the transporter is to be positioned upon the seat of an automobile, the child being strapped within the car seat portion of the superstructure. The transporter is thereafter easily removed from the automobile, and the superstructure is separated from the base member and is maintained in a first extended position away from the base member by a locking mechanism. The maintenance of the superstructure in the extended position away from the base member enables the transporter to be readily pushed by an adult and rolled upon a floor, to function as a stroller. The transporter is converted back into a compact car seat, by unlocking the locking device. Two discrete motions of the child custodian are required for safety reasons, to cause the transporter to be collapsed, before insertion back into the automobile. A convenient foot actuator is provided to assist in this unlocking operation. During the collapsing of the transporter, before insertion back into the automobile, a pair of wheel covers are automatically actuated, to cover the rims of the wheels to prevent any debris picked up by the wheels from being deposited on the car seats, and additionally to stabilize the transporter upon the seat of the automobile.

DESCRIPTION OF PREFERRED EMBODIMENT

Figure 1:
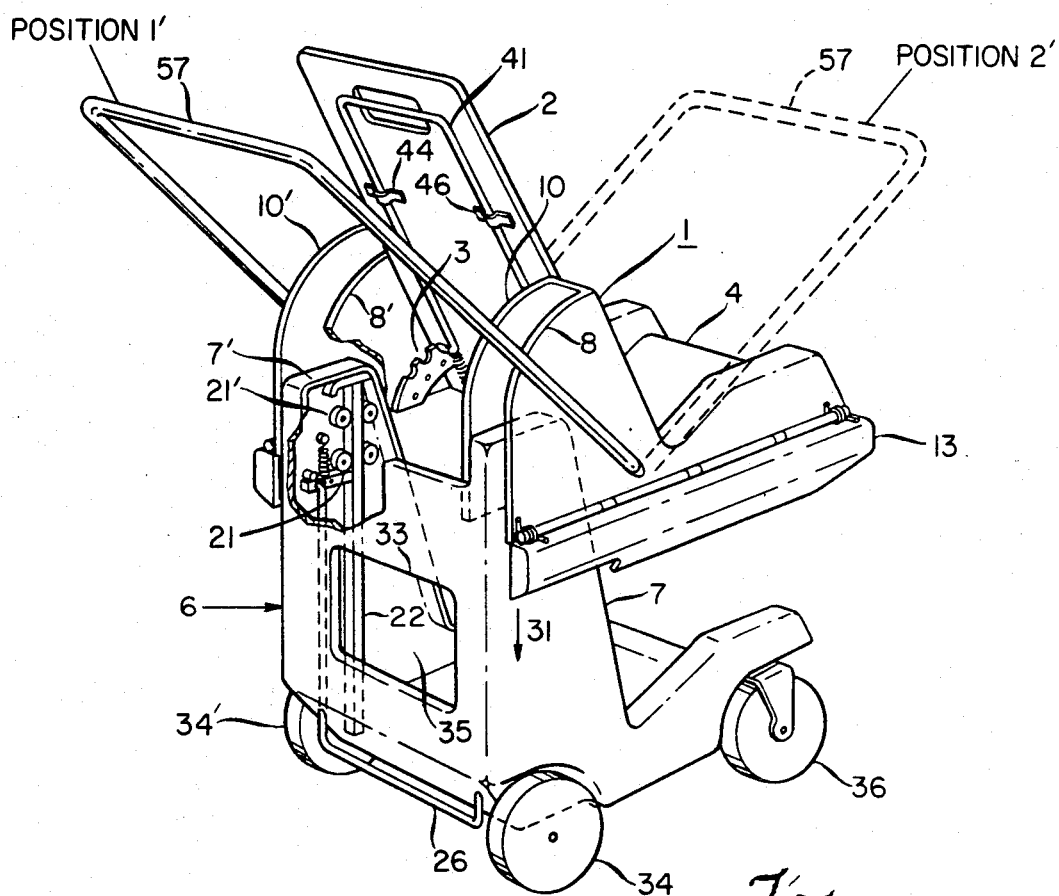
Figure 2:
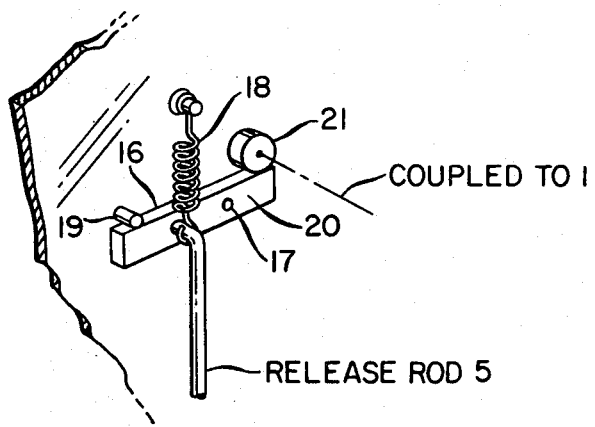

Other objects, features and advantages will occur from the following description of a preferred embodiment and the accompanying drawings, in which:

FIG. 1 illustrates a perspective view of a preferred embodiment, wherein the transporter is in the stroller mode;

FIG. 2 further illustrates the locking device; illustrated in FIG. 1; and

Figure 4:
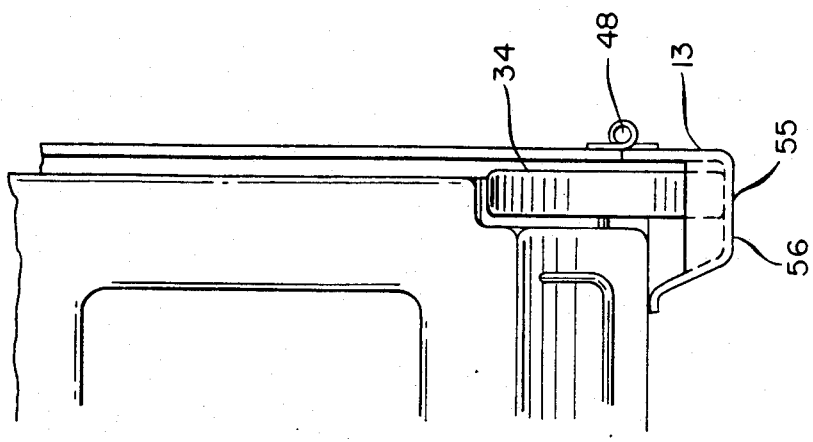
Figure 3:
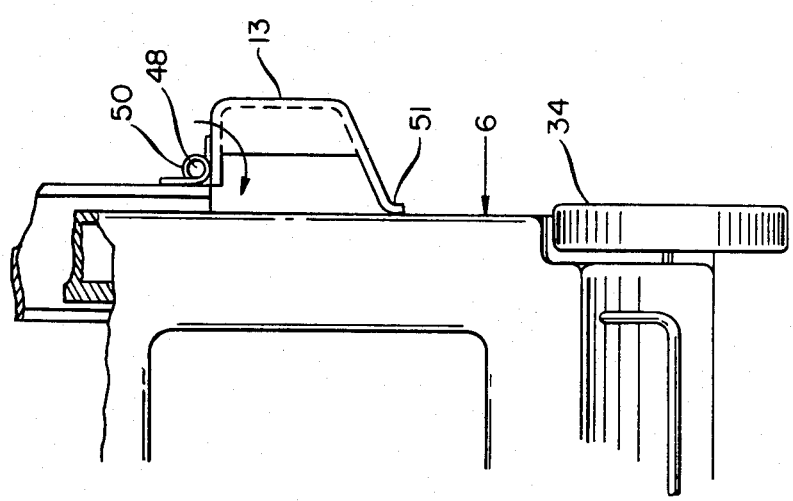

FIGS. 3 and 4 illustrate the operation of the wheel covers.

Referring now to FIG. 1, a superstructure 1 is illustrated having an adjustable chair back member 2 which may be adjusted by a conventional rack type positioner, generally illustrated at 3. A child supporting surface 4 is also illustrated. Thus the superstructure 1 is configured to function in the manner of a car seat for transporting the child upon an automobile trip. Base member 6 is also shown, having a pair of upwardly extending members 7 and 7' interleaved between wall members 8, 10, 8' and 10' of the superstructure. The transporter illustrated in FIG. 1 is in the stroller mode, whereby the superstructure 1 is in a first extended position, separated from base member 6 as shown. The transporter is in the stroller mode, since the parent may readily push the transporter to convey the child along the ground. An extended U-frame pusher bar 57 may be placed in position 1' (see FIG. 1) for pushing the transporter with the child facing in the direction of motion, or it may be placed in position 2' for pushing the transporter with the child facing the one pushing the stroller. During this second scenario the seat back 2 may be reclined to a horizontal position, thus converting the stroller to a pram.

A pair of longitudinally extending wheel covers, one of which is shown in FIG. 1 at 13, is also illustrated, together with a locking device for ensuring the separation of the superstructure from the base member in the extended position shown, to support the child, and to prevent inadvertant motion of the parent from releasing the locking mechanism. FIG. 2 illustrates the locking mechanism that includes lock bar 16 pivotably coupled to the sidewall portion of the base member 6 by pivot pin 17, the locking bar 16 also being upwardly spring biased by means of spring 18 against a pin stop 19 also affixed to the side wall portion of base member 6. A single follower roller 21 is illustrated in FIG. 3, and all four track follower rollers are illustrated in FIG. 1, which ride upon track 22 affixed to base member 6. All follower rollers are rotatably coupled to superstructure 1. This structure aids in the easy relative motion of the superstructure with respect to the base.

Superstructure 1 is maintained in the elevated extended first position, since track follower roller 21, rotatably coupled to the superstructure, is utilized to support the weight of the superstructure against locking bar 16, coupled to the base member. Thus gravity tends to urge roller 21 downwardly, to urge locking bar 16 clockwise against stop pin 19. When it is desirable to cause the transporter to be retractably telescoped to form a compact body which may be placed in the automobile, the parent manipulates the locking device by two distinct motions. The parent lifts the superstructure 1 to enable downward motion of release rod 5, which in turn enables counterclockwise rotation of locking bar portion 20 about pivot 17, to enable the roller followers 21 and 21' to clear the right-hand locking bar portion 20, and the superstructure is thus permitted to descend toward the bottom portions of base member 6, to collapse the device. A foot actuated bar 26 illustrated in FIG. 1, is directly coupled to the lock release rod 5 as indicated in FIG. 1, to facilitate the application of a second force to the lock, after the user applies a first force against the superstructure in the upward direction to cause the track follower roller 21 to clear the locking bar 16. Thus, a convenient and yet safe mechanism is provided for collapsing the transporter, so that the child is never in danger of being injured by a sudden inadvertant release of the lock, to cause the superstructure to plummet downwardly.

A large opening 33 at the rear portion of the base member is also illustrated, opening into a storage area 35 for convenient storage of various items. Two wheels 34 and 36 are illustrated in FIG. 1 rotatably mounted to lower portions of base member 6. Two others are similarly mounted to the opposite side portion of the base member, 34' being partially indicated. A seat belt, not shown, is also positioned upon the superstructure. Adjustment in the angle of the seatback 2 is effected by pulling up upon seatback release rod 41, to cause the lower portions thereof to clear the locking teeth of the release rod device 3; release rod guide members 44 and 46 are also indicated in FIG. 1. A conventional return spring, not shown, is also provided. The seat back may be reclined to a horizontal position for use as a pram.

One of the wheel cover members 13 of FIG. 1 is illustrated in greater detail in FIGS. 3 and 4. Wheel cover 13 is pivotably mounted along its extended length by means of a longitudinal pivot pin 48. A torsional spring 50 urges the wheel cover 13 in a clockwise direction so that the lower portion 51 of wheel cover 13 illustrated in FIG. 3 is urged against the side of the base member 6. Upon unlocking of the locking device, the superstructure moves downwardly toward the collapsed position, and the lower edge portion 51 of the wheel cover member continues to be urged against side portions of wheel 34, until it is able to be fully rotated in a clockwise direction by the above-mentioned torsion spring, to cause it to cover the rim of the wheel, as illustrated in FIG. 4. Thus when the now-collapsed transport is repositioned back into the car, the lower wheel portions are shielded from the car seat, and any debris which may have gathered about the wheels are captured, and do not soil the seat of the car. Also, owing to the configuration of the wheel covers, the transport is made more stable when positioned upon the car seat, compared to having the wheels alone press against upper portions of the car seat. When the transport is again removed from the car, and the superstructure again raised toward the first extended position from the second telescoped position, the resulting reaction force of wheel 34 against the lower portions of the wheel cover at 56, causes the wheel cover to rotate in a counterclockwise direction to clear the wheel, and again be spring-biased against the side portions of base member 6 as illustrated in FIG. 3. Wheel covers 13 may be described as folding wheel covers, since their rotation about the hinge pin 48 causes them to be automatically folded under the wheels as described.

Since the wheel covers have flat bottom portions 55, the transport may also be utilized as a sled, so that the infant may be pulled about over snow. Thus, a relatively simple and easily manufactured child transporter is provided that functions both as a car seat and as a stroller. The relatively complex linkages of currently marketed collapsible strollers are eliminated, by preferably manufacturing the superstructure and base members of lightweight, rigid, non-collapsible bodies, preferably of plastic. Child safety is also somewhat enhanced by eliminating the tedious step of transferring the child from the car seat to a collapsible stroller, and thereafter back to the car seat from the stroller upon the return trip. The need of such stroller is also eliminated to conserve car space and user expense.

The above described embodiments of the invention are merely exemplary, and thus the scope of the invention is not to be limited to the apparatus described, but only by the language of the following claims and reasonable equivalents thereof. For example, a pair of longitudinally extending rollers of small diameter may be employed rather than four individual wheels 34, 34', 36 and 36' as illustrated. Hence the term roller means is employed to cover the wheels as illustrated, and such small diameter rollers. Furthermore the slide mechanism which enables the telescoping of superstructure 1 on base member 6 could employ friction blocks rather than track rollers such as roller 21.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A child transporter comprising:
   child support means having a support surface for supporting said child;
   base means having roller means at lower portions thereof;
   user activated positioning means for selectively causing said child support means to be maintained in a first extended position separated from said roller means, by a sufficient distance to enable said transporter to be readily utilized as a stroller, or to be maintained in a second collapsed position wherein said child support means is adjacent said roller means, enabling said transporter to be utilized as a car seat and readily positioned within a vehicle and upon a seat thereof; and
   said roller means including wheels rotatably mounted to first and second lower portions of said base member and further including wheel cover means, wheel cover support means for mechanically supporting and biasing said wheel cover means against side portions of said base member for causing said wheel cover means to clear said wheels during transition of said superstructure from said first position to said second position, and to thereafter inwardly rotate in a first direction to automatically cover lower rim portions of said wheels.

2. The transporter of claim 1 wherein said wheel cover means are configured to be automatically rotated in a second direction, opposite said first direction, upon transition of said superstructure from said second position to said first position, due to the reaction forces of said wheels against said wheel cover means.

3. The transporter of claim 2 wherein said wheel cover means have horizontally oriented flat portions when said superstructure assumes said second position.

4. A child transporter comprising:
   child support means having a support surface for supporting said child;
   base means having roller means at lower portions thereof; and user activated positioning means for selectively causing said child support means to be maintained in a first extended position separated from said roller means, by a sufficient distance to enable said transporter to be readily utilized as a stroller, or to be maintained in a second collapsed position wherein said child support means is adjacent said roller means, enabling said transporter to be utilized as a car seat and readily positioned within a vehicle and upon a seat thereof, said user actuated positioning means including locking means for maintaining said transporter in said first extended position said locking means requiring the lifting of said child support means and the subsequent actuation of a release bar by said user, for enabling translation of said superstructure from said first extended position to said second collapsed position.

5. A child transporter, comprising:

a superstructure configured to support the child;

a plurality of roller means;

base means, movably interconnected with said superstructure, for rollably supporting said roller means to transport said super structure when said base means is in an extended position relative to said superstructure;

means for guiding said base means as it travels between said extended position and a retracted position within said superstructure which enables said transporter to be utilized as a car seat, said roller means maintaining the same orientation relative to said base means in both said extended and said retracted positions; and roller covering means for automatically covering said roller means including the rolling surface of said roller means when said base means is guided into said retracted position.

6. A child transporter, comprising:

a superstructure configured to support the child;

a plurality of roller means;

base means, movably interconnected with said superstructure, for rollably supporting said roller means to transport said superstructure when said base means is in an extended position relative to said superstructure;

means for guiding said base means as it travels between said extended position and a retracted position within said superstructure which enables said transporter to be utilized as a car seat, said roller means maintaining the same orientation relative to said base means in both said extended and said retracted positions; and locking means for releasably locking said base means in said extended position, said locking means having a release element including foot actuated means, to which force is applied by an operator of said child transporter, for disengaging said base means from said locking means.

7. The child transporter of claim 6 in which said base means is a single, integral structure.

8. The child transporter of claim 6 in which said means for guiding includes track means for slidably directing said base means between said extended and said retracted positions.

* * * * *